US007984389B2

(12) United States Patent
Rusu et al.

(10) Patent No.: US 7,984,389 B2
(45) Date of Patent: Jul. 19, 2011

(54) INFORMATION VISUALIZATION SYSTEM

(75) Inventors: Adrian Rusu, Pitman, NJ (US); Confesor Santiago, III, Carney's Point, NJ (US)

(73) Assignee: Rowan University, Glassboro, NJ (US)

( * ) Notice: Subject to any disclaimer, the term of this patent is extended or adjusted under 35 U.S.C. 154(b) by 1202 days.

(21) Appl. No.: 11/699,061

(22) Filed: Jan. 26, 2007

(65) Prior Publication Data

US 2007/0180408 A1  Aug. 2, 2007

Related U.S. Application Data

(60) Provisional application No. 60/762,580, filed on Jan. 28, 2006.

(51) Int. Cl.
*G06F 3/048* (2006.01)
(52) U.S. Cl. ......... 715/855; 715/850; 715/853; 715/854
(58) Field of Classification Search .................. 715/738, 715/850, 853–855
See application file for complete search history.

(56) References Cited

U.S. PATENT DOCUMENTS

| | | | | |
|---|---|---|---|---|
| 5,619,632 | A | * | 4/1997 | Lamping et al. .............. 345/441 |
| 5,634,062 | A | | 5/1997 | Shimizu et al. |
| 5,774,123 | A | | 6/1998 | Matson |
| 5,812,134 | A | | 9/1998 | Pooser et al. |
| 5,877,766 | A | * | 3/1999 | Bates et al. ................... 715/854 |
| 5,911,145 | A | | 6/1999 | Arora et al. |
| 6,144,962 | A | * | 11/2000 | Weinberg et al. ..................... 1/1 |
| 6,237,006 | B1 | | 5/2001 | Weinberg et al. |
| 6,334,145 | B1 | | 12/2001 | Adams et al. |
| 6,369,819 | B1 | | 4/2002 | Pitkow et al. |
| 6,377,287 | B1 | | 4/2002 | Hao et al. |
| 6,597,377 | B1 | * | 7/2003 | MacPhail ....................... 715/738 |
| 6,888,554 | B1 | * | 5/2005 | Decombe ....................... 345/645 |
| 7,428,705 | B2 | * | 9/2008 | Ronald et al. ................. 715/738 |

(Continued)

FOREIGN PATENT DOCUMENTS

JP        2000222433        11/2000

(Continued)

OTHER PUBLICATIONS

David Durand, at al., MAPA: A System for Inducing and Visualizing Hierarchy in Websites; appearing in Proceedings of ACM Hypertext '98, pp. 66-78, Jun. 1998.

(Continued)

*Primary Examiner* — William L Bashore
*Assistant Examiner* — Sherrod Keaton
(74) *Attorney, Agent, or Firm* — John F. Letchford; Archer & Greiner, P.C.

(57) ABSTRACT

A Web browsing and visualization system and method wherein: (i) Web data is retrieved and displayed in real-time (i.e., Web data is not pre-recorded), (ii) browsing and visualization are synchronized together in the same interface, (iii) a tree-based, rings-type visualization engine, (iv) space-efficient display of visualization, and (v) the amount of resources needed from the host computer is comparatively modest. In addition, the tree-based rings engine used to create the visualization displays the information in a smaller area than previous systems. Thus, the system requires less screen space to display the same amount of information as comparable systems. Alternatively, it can display more information to the user in the same amount of screen space as comparable systems. Moreover, although the present invention is disclosed herein in connection with visualizing Web data, it can be applied to portray any information hierarchy.

2 Claims, 11 Drawing Sheets

U.S. PATENT DOCUMENTS

| | | | |
|---|---|---|---|
| 2001/0027458 A1 | 10/2001 | Wakayama | |
| 2002/0130907 A1 | 9/2002 | Chi et al. | |
| 2002/0178185 A1 | 11/2002 | Kuchinsky et al. | |
| 2003/0020749 A1 | 1/2003 | Abu-Hakima et al. | |
| 2003/0144868 A1* | 7/2003 | MacIntyre et al. | 705/1 |
| 2003/0229850 A1 | 12/2003 | Lue | |
| 2004/0205639 A1 | 10/2004 | Drane et al. | |
| 2005/0010458 A1 | 1/2005 | Holloway et al. | |
| 2005/0022115 A1 | 1/2005 | Baumgartner et al. | |
| 2005/0028089 A1 | 2/2005 | Aoki et al. | |
| 2005/0066269 A1 | 3/2005 | Wang et al. | |
| 2005/0071364 A1 | 3/2005 | Xie et al. | |
| 2005/0114795 A1 | 5/2005 | Beaudoin | |
| 2005/0120288 A1 | 6/2005 | Boehme et al. | |
| 2005/0273730 A1 | 12/2005 | Card et al. | |
| 2006/0074984 A1* | 4/2006 | Milener et al. | 707/104.1 |

FOREIGN PATENT DOCUMENTS

| | | |
|---|---|---|
| JP | 2003186912 | 4/2003 |
| JP | 2005149095 | 9/2005 |

OTHER PUBLICATIONS

Rachna Dhamija, at al., gnuTellaVision: Real Time Visualization of a Peer to Peer Network; 2000.

Junghoo Cho, et al., The Evolution of the Web and Implications for an Incremental Crawler; appearing in Proceeding of 26th International Conference on Very Large Databases (VLDB), pp. 200-209, Sep. 2000.

Timothy Chan, et al., Optimizing Area and Aspect Ration in Straight-Line Orthogonal Tree Drawings; 1996.

Benjamin B. Bederson, et al., A Zooming Web Browser; appearing in 9th Annual ACM Symposium on User-Interface Software and Technology, 1996.

Vishal Anand, et al., Area-Efficient Visualization of Web Data; appearing in Proceedings of the 5th International Conference of Internet Computing, vol. I, pp. 83-89, CSREA Press, 2004.

David Abrams. Human Factors of Personal Web Information Spaces; Master's Thesis, University of Toronto, 1997.

Keith Andrews, Information Visualisation Tutorial Notes; 2002.

Ed H. Chi, et al., The Scent of a Site: A System for Analyzing and Predicting Information Scent, Usage and Usability of a Web Site; appearing in Proceedings of the Human Factors in Computing Systems, CHI'00, pp. 161-168, 2000.

Chris Olston, et al., ScentTrails: Integrating Browsing and Searching on the Web; 2001.

Ed H. Chi, Improving Web Usability Through Visualization; appearing in IEEE Internet Computing, pp. 64-71, Mar./Apr. 2002.

Melody Y. Ivory, et al., Improving Web Site Design; appearing in IEEE Internet Computing, pp. 56-63, Mar./Apr. 2002.

Tamara Munzner, et al., Visualizing the Structure of the World Wide Web in 3D Hyperbolic Space; appearing in Proceedings of the 1st Symposium the VRML Modeling Language: Special Issue of Computer Graphics, pp. 33-38. ACM Press, 14-15, 1995.

Kristen Risden, et al., An Initial Examination of Ease of Use for 2D and 3D Information Visualizations of Web Content; appearing in International Journal of Human Computer Studies, 53(5) pp. 695-714, 2000.

Sarah J. Waterson, WebQuilt: A Visual Analysis Tool for Understanding Web Usability Clickstream Data; Master's Thesis, University of California, Berkeley, 2002.

Soon Tee Teoh, et al., RINGS: A Technique for Visualizing Large Hierarchies; appearing in Proceedings of the 10th International Symposium on Graph Drawing, vol. 2528, pp. 268-275, 2002.

Ka-Ping Yee, et al., Animated Exploration of Dynamic Graphs with Radial Layout; appearing in IEEE Symposium on Information Visualization, pp. 43-50, 2001.

Patricia Wright, Cognitive Overheads and Prostheses: Some Issues in Evaluating Hypertexts; appearing in Proceedings of the ACM Hypertext '91 Conference, pp. 1-12, 1991.

Jacqueline Waniek, et al., MemoSpace: A Visualization Tool for Web Navigation; appearing in Special Interest Tracks and Posters of the 14th International Conference on World Wide Web pp. 900-901, ACM Press, New York, NY, May 2005.

John Stasko, et al., Focus+Context Display and Navigation Techniques for Enhancing Radial, Space-Filing Hierarchy Visualizations, appearing in IEE Symposium on Information Visualization, pp. 57-65, 2000.

Ben Shneiderman, Tree Visualization with Tree-Maps: 2-d Space-Filling Approach; appearing in ACM Transaction on Graphics, vol. 11, No. 1, pp. 92-99, Jan. 1992.

Manojit Sarkar, et al., Graphical Fisheye Views; appearing in Communications of the ACM, vol. 37, No. 12, pp. 73-83, Dec. 1994.

Adrian Rusu, et al., An Experimental Study on Algorithms for Drawing Binary Trees; appearing in Proceedings of the Asia Pacific Symposium on Information Visualization (APVIS2006) vol. 60, CRPIT, 2006.

H.C. Purchase, et al., An Experimental Study of the Basis for Graph Drawing Algorithms; appearing in ACM Journal of Experimental Algorithms, vol. 2, 1997.

Quang Vinh Nguyen, et al., EncCon: An Approach to Constructing Interactive Visualization of Large Hierarchical Data; appearing in Information Visualization, 4(1), pp. 1-21, Mar. 2005.

Sougata Mukherjea, et al., Visualizing the World-Wide Web with the Navigational View Builder; appearing in Computer Network and ISDN Systems, Special Issue on the Third Int. Conference on the World-Wide Web, Apr. 1995.

John Lamping, et al., A Focus+Context Technique Based on Hyperbolic Geometry for Visualizing Large Hierarchies; appearing in Proceeding of the Conference on Human Factors in Computing Systems, pp. 401-408, 1995.

T. J. Jankun-Kelly, et al., MoireGraphs: Radial Focus+Context Visualization and Interaction for Graphs with Visual Nodes; appearing in IEEE Symposium on Information Visualization, pp. 59-66, 2003.

Stephen C. Hirtle, et al., Clusters on the World Wide Web: Creating Neighborhoods of Make-Believe; appearing in Hypertext '98, pp. 289-290, 1997.

Misook Heo, An Empirical Comparison of Visualization Tools to Assist Information Retrieval on the Web; appearing in Journal of the American Society for Information Science and Technology, 52(8), pp. 666-675, Jun. 2001.

Robert C. Miller, et al., Sphinx: A framework for Creating Personal, Site-Specific Web Crawlers; appearing in Computer Network and ISDN Systems, vol. 30, pp. 119-130, 1998.

* cited by examiner

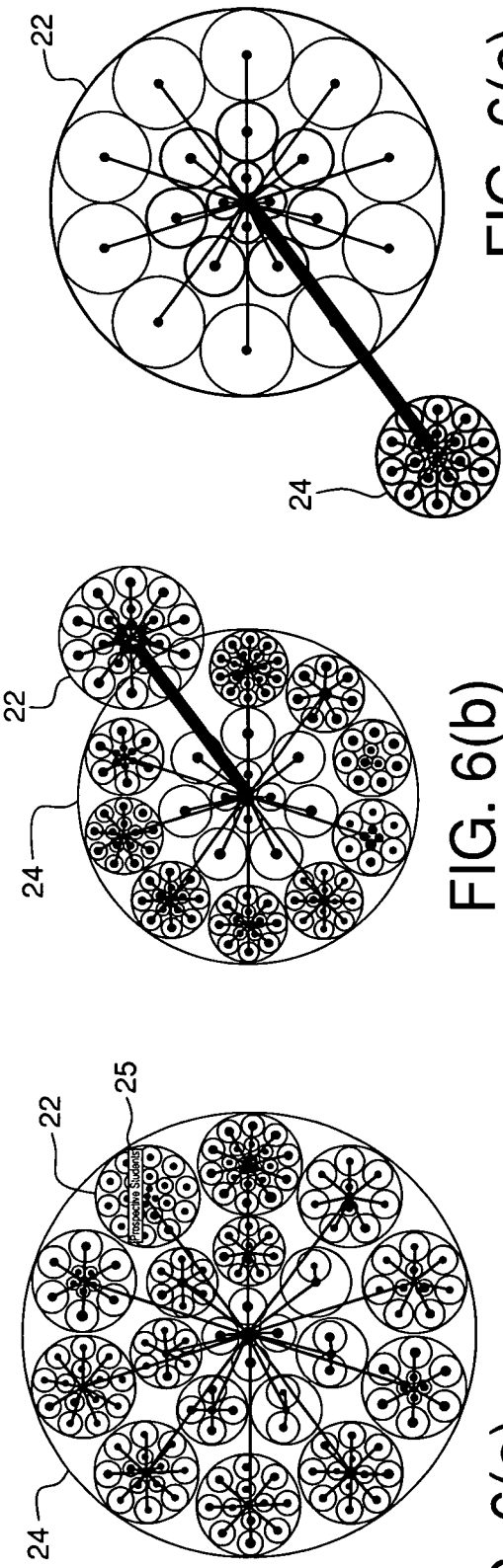
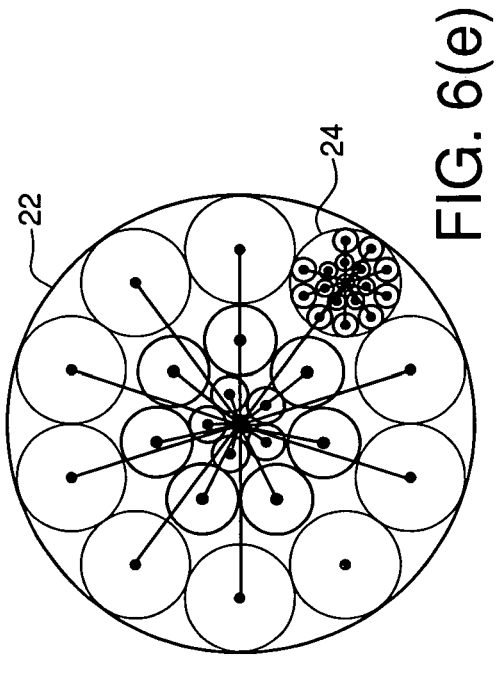
FIG. 6(a)
FIG. 6(b)
FIG. 6(c)
FIG. 6(d)
FIG. 6(e)

INFORMATION VISUALIZATION SYSTEM

CROSS REFERENCE TO RELATED APPLICATION(S)

The present application claims the benefit of U.S. Provisional Patent Application No. 60/762,580, filed Jan. 28, 2006, which is incorporated herein by reference in its entirety.

FIELD OF THE INVENTION

The present invention relates in general to a tree-based information visualization system and in particular to a system having particular usefulness in visualizing the structure of a World Wide Web ("WWW" or "Web") site or any information or database hierarchy.

BACKGROUND OF THE INVENTION

The Web today has become an enormous source of information and users have access to a steadily increasing number of Web pages, generally linked in a non-intuitive manner. The Web is popularly referred to as "cyberspace." However, the extent to which it constitutes a readily navigable space in the everyday sense of the word is questionable. Consequently, repeatedly reported problems in Web navigation are not knowing where you are, not knowing how to get back to previously visited information, and not knowing which sites have already been visited. The problem of users' disorientation in the Web which emerges from the high complexity of the Web environment is often referred to as the "lost in cyberspace" problem.

Various approaches have been proposed to categorize and sensibly present Web data efficiently to users. For example, the structure of the Web can be modeled as a graph wherein the nodes are HTML pages, and a hyperlink from one page to another is represented as a directed edge. An alternative are tree hierarchies. An advantage of trees is that they have much simpler structures than graphs which make them easier to display in an aesthetically pleasing manner.

A map or visualization of a Web site or other information repository reduces the user's cognitive load when trying to navigate a virtual space. That is, it reduces the burden on long term and working memory, summarizing the information about the structure and organization that would otherwise have to be remembered. Therefore, extensive effort has been put in developing methods to visually represent Web data. Pad++, Hy+, Navigational View Builder, HyperSpace, Natto, Ptolomaeus, MAPA, Disk Trees, Dome Trees, VISVIP, BrowsingGraph/BrowsingIcons, XML3D, HotSauce, MemoSpace, Grokker, and WebTracer are some of the methods specifically designed to represent Web data in order to improve navigation through the Web, reduce disorientation problems within the Web, and increase the ease and speed of exploring and retrieving pages of interest. Other methods such as Space Tree, Treemaps and Hyperbolic Tree, which were initially designed to visualize hierarchical data, have also been adapted to map Web data. All of the foregoing are described in detail by their authors in documents submitted with an accompanying information disclosure statement.

However, very few of these methods have been adopted and are currently being used as viable solutions to the lost in cyberspace problem. Reasons may include requiring a large amount of resources from the host computer (Natto, MemoSpace, Hyperspace, HotSauce, MAPA, Navigational View Builder, WebTracer), unaesthetic drawings (Ptolomaeus, Disk Trees, Dome Trees, BrowsingGraph/BrowsingIcons), inefficient use of screen space (Pad++, Space Tree, Hyperbolic Tree and XML3D), and being counterintuitive to how humans perceive relational information (Treemaps).

The following sets forth in more detail the deficiencies of some of the foregoing and other Web mapping applications.

Pad++ lacks the ability to show which Web pages have already been visited and Web pages that will arise in the future. In addition, Pad++ does not make efficient usage of the screen space.

Hy+ does not make efficient usage of the screen space. Another drawback is when a user clicks the "Back" and "Forward" button in the Web browser, the edge in the visualization representing this action is omitted. Omitting this action fails to answer the "where have I been?" question.

Navigational View Builder uses a database-oriented hypermedia system, which over time becomes out-of-date. Also, it does not make efficient use of space.

HyperSpace uses an adapted browser and separate program to extract links from visited pages. Other drawbacks of HyperSpace are that the links and sphere nodes are heavily occluded, browsing history is not tracked, and the system is not synchronized with a Web browser.

Natto limits the number of nodes that may comfortably occupy the flat plane (occlusion issue), and the range of pages is fixed.

Ptolomaeus shows only the Web pages that appear in the visualization after the Web crawler completes the Web page retrieval process. Also, another drawback of Ptolomaeus is in its inefficient use of space.

MAPA uses labels and cards to represent the WWW and the information quickly becomes occluded. Also, MAPA is not dually synchronized with a Web browser. And, all the mapped information is stored in a database and not captured in real time.

Disk Trees uses many overlaying linking edges that occlude information. Another drawback of Disk Trees is that it is a bottom-up algorithm. That is, the whole tree needs to be processed before displaying it to the user.

Dome Trees is similar to Disk Trees in that it is a bottom-up algorithm.

VISVIP makes poor use of space and it has no clear way of labeling the boxes.

BrowsingGraph/BrowsingIcons uses a Web browser that is not completely integrated within the system. The algorithm used to draw the graph, which represents how the Web pages are related, is not space-efficient. That is, there is considerable much white space in the drawing area that is unused.

XML3D contains node/label occlusion and the distant features within the three-dimensional space are distorted. Furthermore, it contains long connecting edges between nodes. Long connecting edges in a graph are more difficult to follow than shorter edges.

Among the drawbacks of HotSauce are its difficulties in finding pages and, once immersed in the space and surrounded by blocks, it is easy to become disoriented. Another drawback with HotSauce is the frequent occlusion of labels.

MemoSpace does not make efficient usage of the screen space and labels denoting a Web page's address are large in size and occlusive.

Grokker, developed by Groxis Inc., is a Web-based tool used to visualize Web data. Grokker allows user to enter federated searches and organizes the results in two ways: outline view and map view. The map view uses a radial layout algorithm. Unlike the present invention, Grokker organizes Web data based on content relationships. The present invention creates a hierarchy of Web pages based on their location in the WWW. Another difference between Grokker and the present invention is that Grokker visualizes a broad range of pages stemming from the user's query. In contrast, the present method visualizes a particular area in the WWW starting from a user-specified Web page.

WebTracer uses a system in which Web crawling and visualization are separate and not integrated synchronized processes. WebTracer possesses other drawbacks: (1) the user can click on an atom (Web page) and the Web page appears in the computer's default Web browser; (2) it does not make efficient usage of the screen space, and (3) it contains many edge intersections, which makes it harder to understand the Web pages' relationships. Indeed, the web visualization produced by WebTracer appears as a disorienting three-dimensional "starburst". While user can manipulate the image to view it from any desired direction, the image itself is static and unanimated. A comparison between the present solution and WebTracer was performed by the inventors. The instant solution and WebTracer were used on the same computer, using the same Internet speed, and starting from the same Web page. The advantageous results of the present solution compared to WebTracer were as follows:

Computer Memory (RAM)—27% more efficient.
Computer processing (CPU)—50% more efficient.
Web crawling speed—63% faster.

SUMMARY OF THE INVENTION

The present invention provides a Web browsing and visualization method that overcomes the individual deficiencies of the prior art by introducing a novel Web browsing and visualization method as a viable solution to the lost in cyberspace problem, with the following innovative combination of features:

Real-time functionality: In contrast to previous methods, which use prerecorded information to generate visualizations, the present method retrieves and displays Web data in real-time (i.e., not archived or pre-recorded).

Synchronization: Unlike previous methods, which either are stand-alone visualizations or use a separate Web browser to display Web pages, the present method brings browsing and visualization together, synchronized in the same interface. Synchronization of the interfaces resolves the previously observed dilemmas in the study of supporting tools used when retrieving information from the Web.

Tree-based engine: Humans perceive relational information more easily if it is modeled in visual rather than literal (e.g., outline) form. As mentioned above, various approaches have been posed to categorize and sensibly present Web data efficiently to users. For example, the structure of the Web can be modeled as a graph wherein the nodes are HTML pages, and a hyperlink from one page to another is represented as a directed edge. An alternative are tree hierarchies. An advantage of trees is that they have much simpler structures than graphs which make them easier to display in an aesthetically pleasing manner. Similar to several previous methods such as Pad++, Space Tree, and Hyperbolic Tree, the present system and method uses a tree-based visualization engine.

Space-efficiency: Providing space-efficient visual representations of Web data is of utmost importance given the large amount of information and the limited space available on the screen of a computer monitor. As used herein, the screen of a "computer monitor" means any means by which images may be perceived by a user including, without limitation, the screens of a stand-alone computer monitor, a computer-compatible television monitor, a laptop or other compact computer, a personal digital assistant, a cellular telephone, or any like device presently known or hereinafter developed. Previous methods which use graph-based engines for visualization do not make good use of the screen space by not properly filling the available white space with information. Providing more information in an on-screen visualization (and thus minimizing the white space) is preferred, as the human brain is capable of filtering the information more efficiently. The tree-based rings engine of the present invention displays the information in a smaller area than previous systems. Thus, the system requires less screen space to display the same amount of information, or it can display more information in the same amount of screen space, in relation to prior comparable systems.

Efficient use of host computer resources: Previous non-graph-based methods require a significant amount of resources from the host computer. Given the diversity of Web users, it cannot be assumed that most own computers with such capabilities. The present method requires comparatively limited resources, thus making it simpler for everyday Web users to access and use the present system.

Moreover, although the present invention is disclosed herein in connection with visualizing Web data, it can be applied to portray any information hierarchy.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein:

FIGS. 6(a), 6(b), 6(c), 6(d) and 6(e) depict progressive animation states of an information visualization system according to the present invention

DETAILED DESCRIPTION OF THE INVENTION

Ordinary Internet users often get lost in cyberspace because they have no idea what to expect as they traverse the space (i.e., they have no spatial context as they move about the Web). In addition, there does not exist a consistent, standard methodology for organizing distinct Websites. Consequently, users of the Web suffer from information overload because they have the option of too many Web pages to visit. As seen in FIGS. 1(a)-1(d) a typical "lost in cyberspace" scenario could be as simple as the following: a user, while browsing the Web, proceeds from Website A (FIG. 1(a)) when finding an interesting link to Website B (FIG. 1(b)). While at Website B, the user finds another interesting link. This takes the user to Website F (FIG. 1(c)) where the user browses and chooses another link that leads the user to Website J (FIG. 1(d)). At this point, the user wants to go back to where she started and wonders where she was when she originally started browsing. The user can use the back option and gauge her location, but there is no context to this method. The present system aids in minimizing the frequency of this scenario and is intended to provide a mapping of the location within the cyberspace which is understandable to both ordinary and sophisticated users of the Web.

Another "lost in cyberspace" scenario can occur when using the back and forward functionality of a Web browser. The scenario is as follows: a user starts at Website A, then proceeds to Website B. After finding no desired links, the user clicks back to return to Website A. Now, the user chooses Website C, and after failing to discover interesting information, returns back to Website A. With the back and forward functionality, the user can traverse backward and forward in his or her browsing history, but in this scenario after going to Website C, Website B escapes the forward traversal Web browsing functionality and it does not appear in the drop-down list that contains recently visited pages. Once the user understands the Website map layout and animation process of the present invention, the lost in cyberspace problem is eliminated.

Furthermore, regular Internet users normally take less than a few seconds to evaluate a Website and decide whether or not to stay and browse. In this regard, another advantage of the present system is that it offers a solution that can help a Website designer to better design and present the information in a Website by easily visually analyzing the Website design in order to improve the "stickiness" of the Website (i.e., increasing the noticeability of Web pages and minimizing the time ordinary users spend locating information on the Website).

The present invention also complements search engine searches in that sense that once a user is at a desired Website, the user has a clearer understanding of the Website and is able to locate desired information and other related information more efficiently.

Figures 1A, 1B:
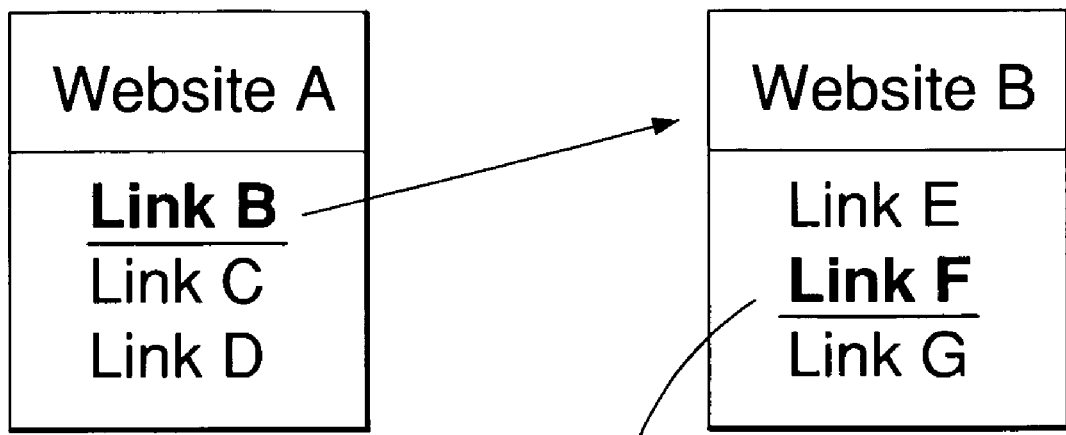
FIGS. 1(a), 1(b), 1(c) and 1(d) depict a typical lost in cyberspace traversal path.
Figures 1C, 1D:
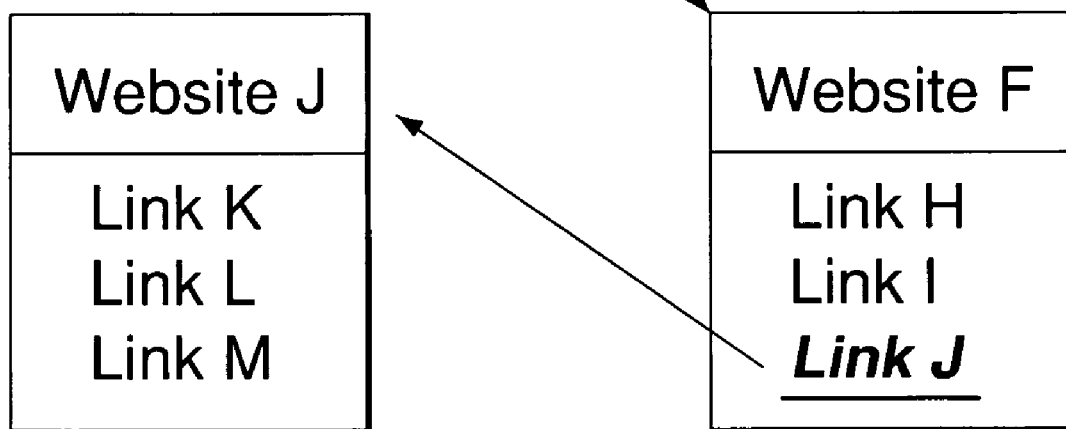
Figure 2:
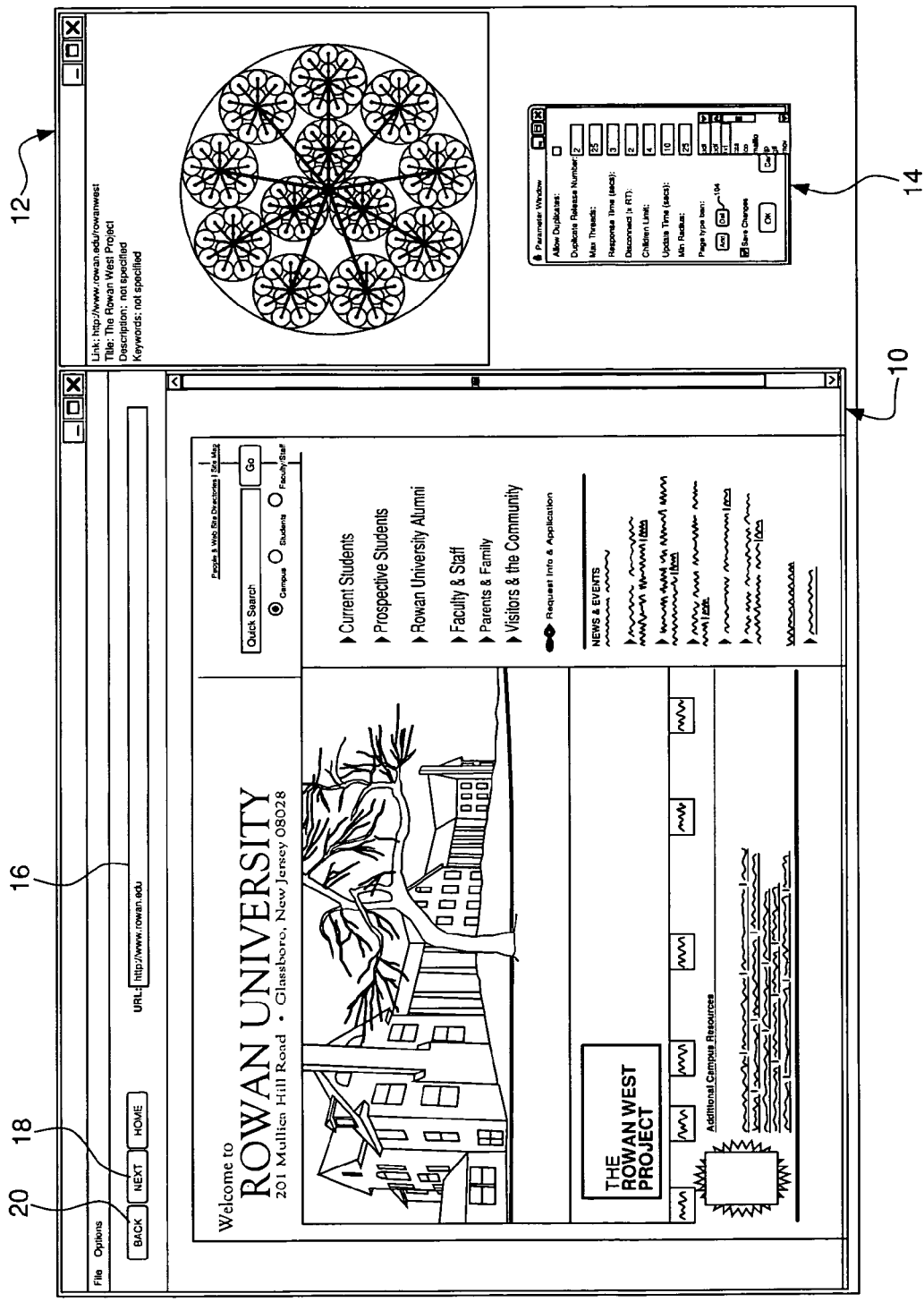
FIG. 2 is a representative example of imagery a user might experience when viewing a computer monitor screen and using an information visualization system according to the present invention.

FIG. 2 is a representative example of generalized imagery a user might experience when viewing a computer monitor screen when using the information visualization system according to the present invention. As seen in FIG. 2, from the end user's visual perspective, the present system is divided primarily into two main parts: a browser window 10 and a visualization window 12. The user views the image of the Web page on which she is currently residing on one region of the computer monitor screen (browser window 10). Concurrently, a user would view a tree-based, rings-type visualization of a graphical map of the entire Website (subject to limitations imposed by the user, discussed below) on another region of the computer screen (visualization window 12). The visualization window displays a map of all pages of a Website (including those the user has already visited as well as those the user may choose to visit) without the user having to physically navigate through the Web pages. This is in contrast to prior systems wherein the user could view on a single screen either a map of a Website or a Web page associated with that site on her computer screen, but not both at the same time.

Optionally deployable parameter window 14 (FIGS. 2 and 10) and/or statistics window 15 (FIG. 11), discussed below, may also be made visible on the user's computer screen if the user so chooses. The data presented on the parameter and statistics windows 14 and 15 are interrelated and may be of interest to ordinary end users as well as Web designers.

The present system comprises a Web browser whose output is displayed by browser window 10. The browser may be provided with any range of functionality from minimal to sophisticated (including such features as "favorites", "refresh", "stop", "history", "print", and the like). Using the browser, the user enters a Web address in the provided URL textbox 16. Upon entering an address, if valid, the selected Web page loads and displays in browser window 10. Next (Forward) and Back buttons 18 and 20 are included to allow for traversal through already viewed pages.

A more detailed discussion of the underlying logic, layout and operation of the visualization window 12 is provided hereinbelow. Preferably, although not necessarily, the graphical user interface ("GUI" or "interface") of the system uses freely floating windows. In this way, the user can move each window to a desired location, based on available free space or screen layout preference.

The visualization engine of the present invention is an adaptation of the "Rings" information visualization technique posited by Soon Tee Teoh and Kwan-Liu Ma in *Proceedings 10$^{th}$ International Symposium on Graph Drawing*, Vol. 2528, pp. 268-275, 2002, the disclosure of which is provided in the accompanying information disclosure statement. However, in the interest of complete disclosure, the following is a description of the "Rings" information visualization and animation process in general and as deployed in the present system, in particular.

Radial graph visualizations locate the focus node at the center of the layout and nodes connected to the focus node radiate outwardly on uniformly separated rings. In the "Rings" algorithm a tree is drawn as a circle with the root placed in the center; hence it is called "Rings." The "Rings" algorithm establishes the geometrical plane step of interactive visualization. The subtrees rooted at the children of the root are drawn recursively as circles placed in concentric rings around the center of the circle in such a way that efficient use of space is ensured.

In the original "Rings" algorithm, the children of the root first are divided into N categories according to their size. One ring is assigned to each category. Thus, the outer rings consist of the "largest" trees while the inner rings consist of the "smallest" ones. In this way each tree is allocated space according to its needs. However, because of this ordering based on the size of the children, the algorithm needs to know the entire tree before it can start generating the drawing. That is, the original "Rings" algorithm produces a visualization based on pre-existing information and cannot provide a visualization of evolving information in real time.

In contrast, the present invention produces a rings-type visualization in real-time. To achieve this effect, a top-down drawing algorithm is needed. More particularly, the present system departs from the original "Rings" algorithm by not organizing the subtrees based on their sizes. This distinction thus allows the present algorithm to start drawing the tree much sooner. While slightly less efficient than the original version of Rings in terms of use of space, the present system allows for a much faster generation of the drawing. The outcome is a speed increase in visualization productivity which is very significant and unique to the present invention.

Another modification to the "Rings" algorithm lies in the arrangement of nodes inside the tree. Since the size of a tree is disregarded, arranging the rings based on a tree's need is irrelevant. Therefore, in the present system all nodes of the tree are equivalent. Thus, in the present visualization, the best method of arranging the nodes is to draw them as close to the same size as possible for every ring in the tree, hence making the nodes appear substantially visually equal. To achieve this effect, a new arrangement algorithm was developed (discussed below).

Figure 3:
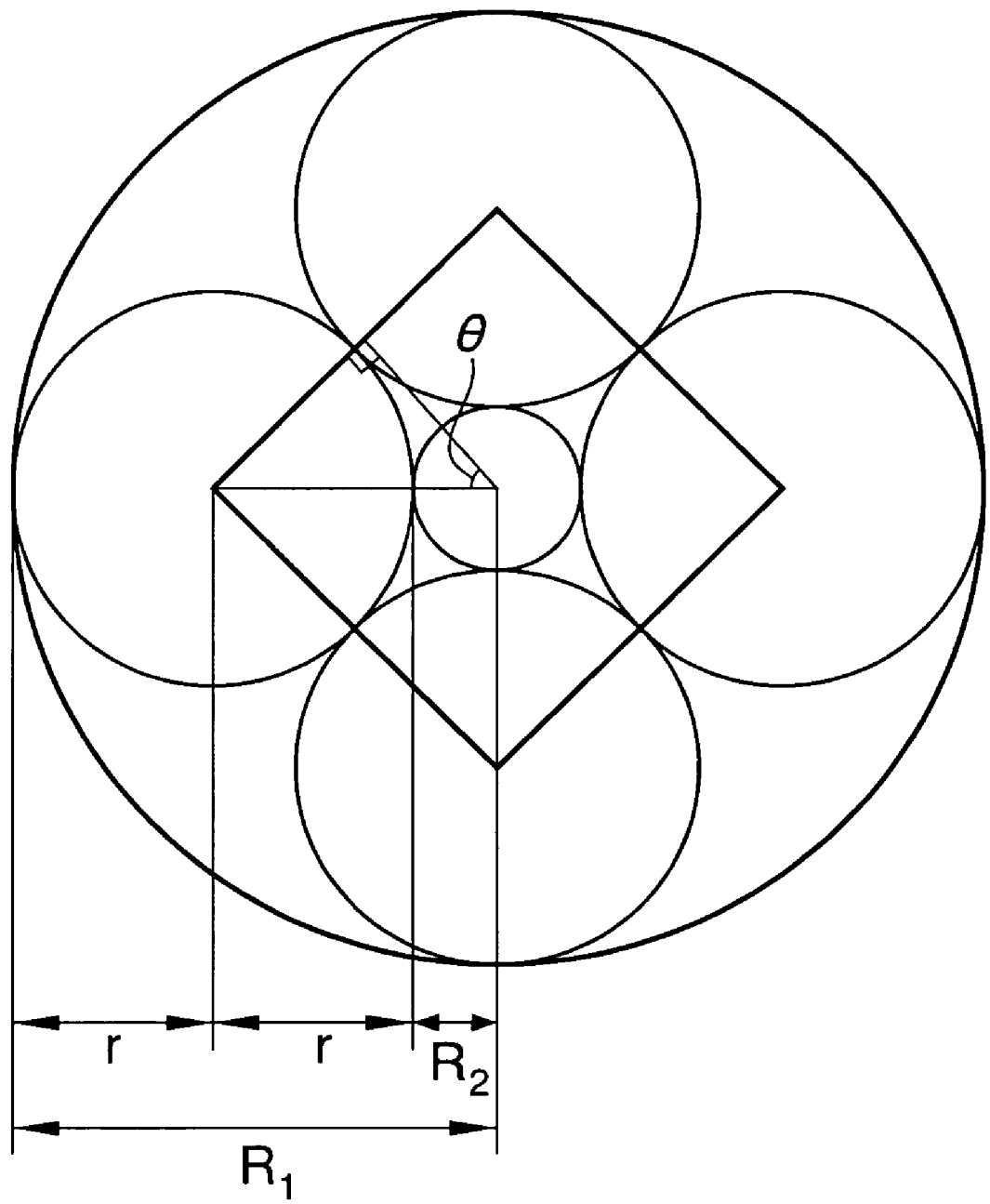
FIG. 3 illustrates mathematical variables employed by a presently existing rings-type information visualization algorithm when graphically depicting hierarchical information.

As mentioned above, "Rings" places circles corresponding to children in concentric rings around the center of the parent node. Connecting the centers of n equal circles placed in a ring makes an n-sided regular polygon. In FIG. 3, $\theta=\pi/n$, where n is the number of circles in a ring, and $\theta$ is in radians. A simple relationship can be derived between the number of children circles in the outermost ring and the percentage of area taken up by the ring. Next, f(n), the fraction of the area left after n circles have been placed in the ring is given by:

$$f(n) = \frac{(R_2)^2}{(R_1)^2} = \frac{(1-\sin(\theta))^2}{(1+\sin(\theta))^2} = \frac{\left(1-\sin\left(\frac{\pi}{n}\right)\right)^2}{\left(1+\sin\left(\frac{\pi}{n}\right)\right)^2}$$

Using this relationship, the number of children to be placed in each concentric ring can be determined.

The rings-type algorithm of the present invention populates the graphical map displayed by visualization window 12 differently from the original "Rings" algorithm. More particularly, the instant algorithm departs from the original "Rings" algorithm by starting using the input N, the total number of circles (nodes) to place in the Web visualization map's outer boundary circle. Next, the present algorithm finds the value k, the number of nodes to be placed in the outermost ring of circles within the outer boundary circle. The value k is determined by calculating which value of f(k), where k is an integer between $\{1, 2, \ldots, N\}$, has the smallest fractional difference to the percentage of children used. Preferably, for optimum use of space, the percentage of space used in the outermost ring (and recursively calculated inner rings, discussed below) is as close as possible to the percentage of the total number of children (nodes) used in that particular ring space (i.e., $k/N \approx f(k)$). The following is pseudocode for determining k:

```
Algorithm Find k
    Input: the total number of nodes (children) in a tree,
N;
    Output: the number of circles to place in a ring, k;
    minDifference = INFINITY;
    //Find the arrangement that results in the percent of
    nodes and area left after placement being the closest.
    for each number of node i in N {
        areaLeft = f(i);
        nodesLeft = 1 – (i/N);
        if ( areaLeft < nodesLeft ) then
            difference = nodesLeft – areaLeft;
        else
            difference = areaLeft – nodesLeft;
        if ( difference < minDifference ) {
            minDifference = difference ;
            k ToReturn = i;
        }
    }
```

```
    //Do not want one node left, so add to previous
    if (N–k ToReturn) = 1 then
        return (k ToReturn+1);
    return k ToReturn;
end Algorithm.
```

Next, k circles are placed in the outermost ring. The rest of the children are placed recursively in the same way in sequential inner rings, with each new input N for each subsequent inner ring equaling the previous N minus the previous k (denoting how many circles remain after placing k nodes in the previous ring that may be possibly placed in the remaining inner rings).

This variation in the basic "Rings" algorithm is one of the main advantages of using the present algorithm. That is, only one level of information is needed in advance to produce a first drawing of a tree. Thereafter, the drawing can be refined in real-time by filling up the circles drawn in the previous step as new information becomes available. This new information allows the user to "browse into the future" because the newly drawn Web pages, which appear deeper in the hierarchy, can be evaluated without having to load them into the Web browser. In addition, there are no edge crossings inside child nodes which results in less clutter in the visualization. The only crossings that occur in the visualization are the edges that connect a parent node to its children.

"Rings" and the present adaptation thereof are focus-plus-context algorithms, i.e., a part of the tree is presented in great detail while the rest of the tree is kept visible, but with a lower degree of detail. The user has complete control of which data she wants to see more clearly. The focus is the tree with the root placed in the center of the main circle since that tree has the largest allocated drawing area. The user can change focus by selecting a subtree rooted in one of the children of the main root or by selecting a Web link, which exist in the visualization, via the browser. If the child was selected via the browser and does not exist in the visualization, the visualization and crawling will completely restart at the Web page (parent page) shown in the browser window 10. However, if the child page selected via the browser does exist in the visualization, that child will be moved to the center of the drawing and the parent will be moved to the side and eventually absorbed within the selected child page. According to the invention, this is performed as a smooth animation, described in FIGS. 6(*a*)-6(*e*) in order to preserve the user's mental map of the related pages. The refocusing functionality establishes the view navigation step of interactive visualization. After the refocusing is complete, the Web page that the new focus node represents is loaded by the browser into the browser window 10. This cooperation between the visualization window 12 and browser window 10 illustrates the very important synchronizing capability of the present system.

In addition, the algorithm set forth above is useful for producing a two-dimensional visualization of a particular Website. It is also contemplated that a suitable algorithm may be employed to produce a three-dimensional visualization of a Website. Three-dimensional visualizations offer more flexibility in displaying the information, but may be too information intensive for the ordinary end user, although they may be desirable for Website designers or analysts that may want to have a three-dimensional map of a Website.

Figure 4:
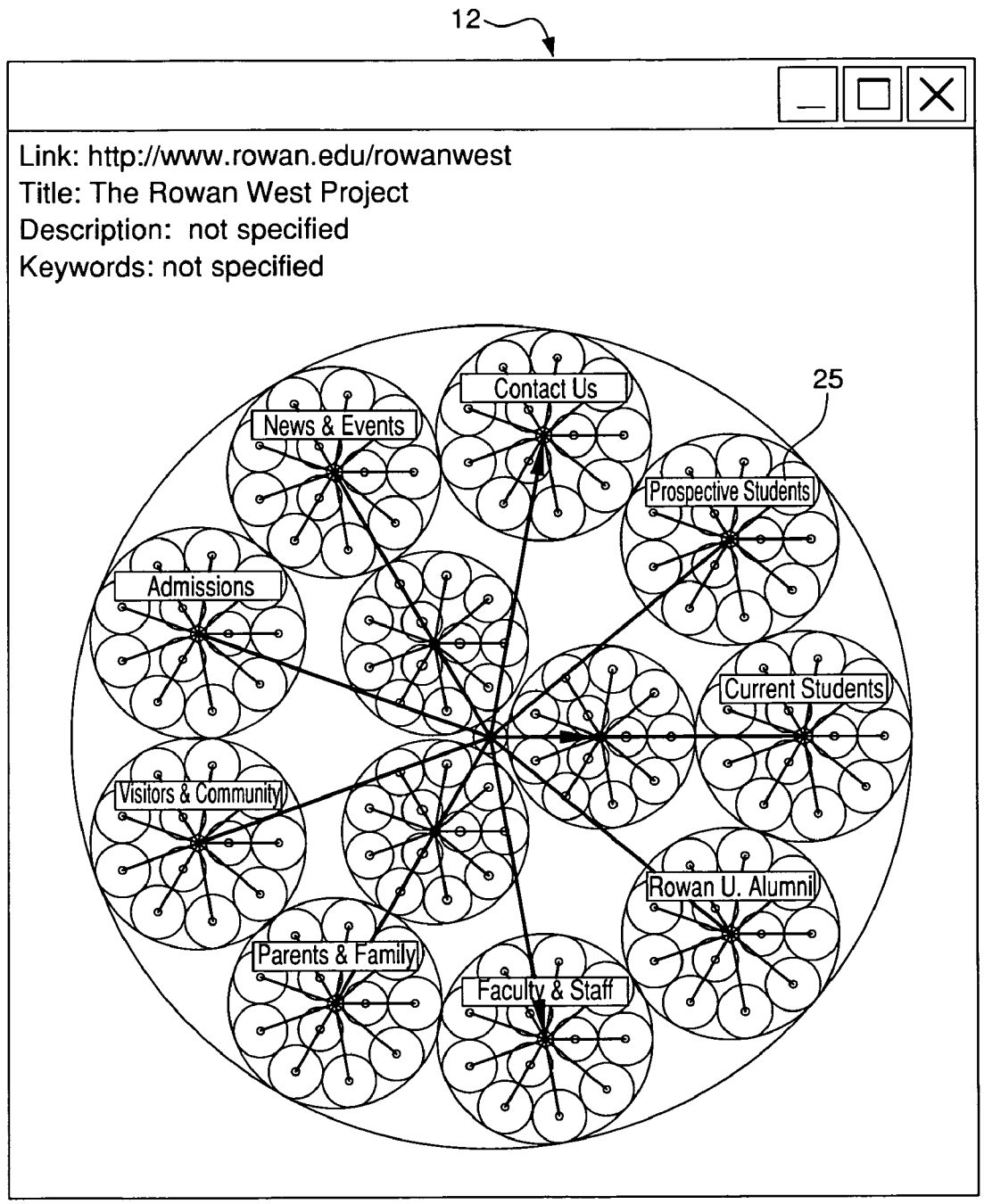
FIG. 4 is an enlarged view of an exemplary visualization window that may be displayed by an information visualization system according to the present invention.

FIG. 4 is an enlarged view of visualization window 12 of FIG. 2 and depicts further presently preferred features of the information visualization system according to the present invention that could not be clearly depicted in FIG. 2 because of limited space. As seen in FIG. 4, each defined "subtree" node 22 of a parent ring 24 in the visualization window 12 is preferably provided with a label 25 which generally categorizes the content of the Web pages of that subtree node. Labels 25 may, but not necessarily, include prominent link identifiers shown in the Web page displayed in browser window 10. In the illustrated example, for instance, labels 25 may include the "Current Students", "Prospective Students", Rowan University Alumni", "Parents & Family", "Visitors & the Community", "News & Events" and links to other Web pages featured on the Web page displayed in the browser window 10.

As also shown in FIG. 4, is it preferable that the edges or links to previously selected nodes radiating from the currently selected node be symbolized as arrows or vectors to distinguish them from unselected nodes.

Figure 5:
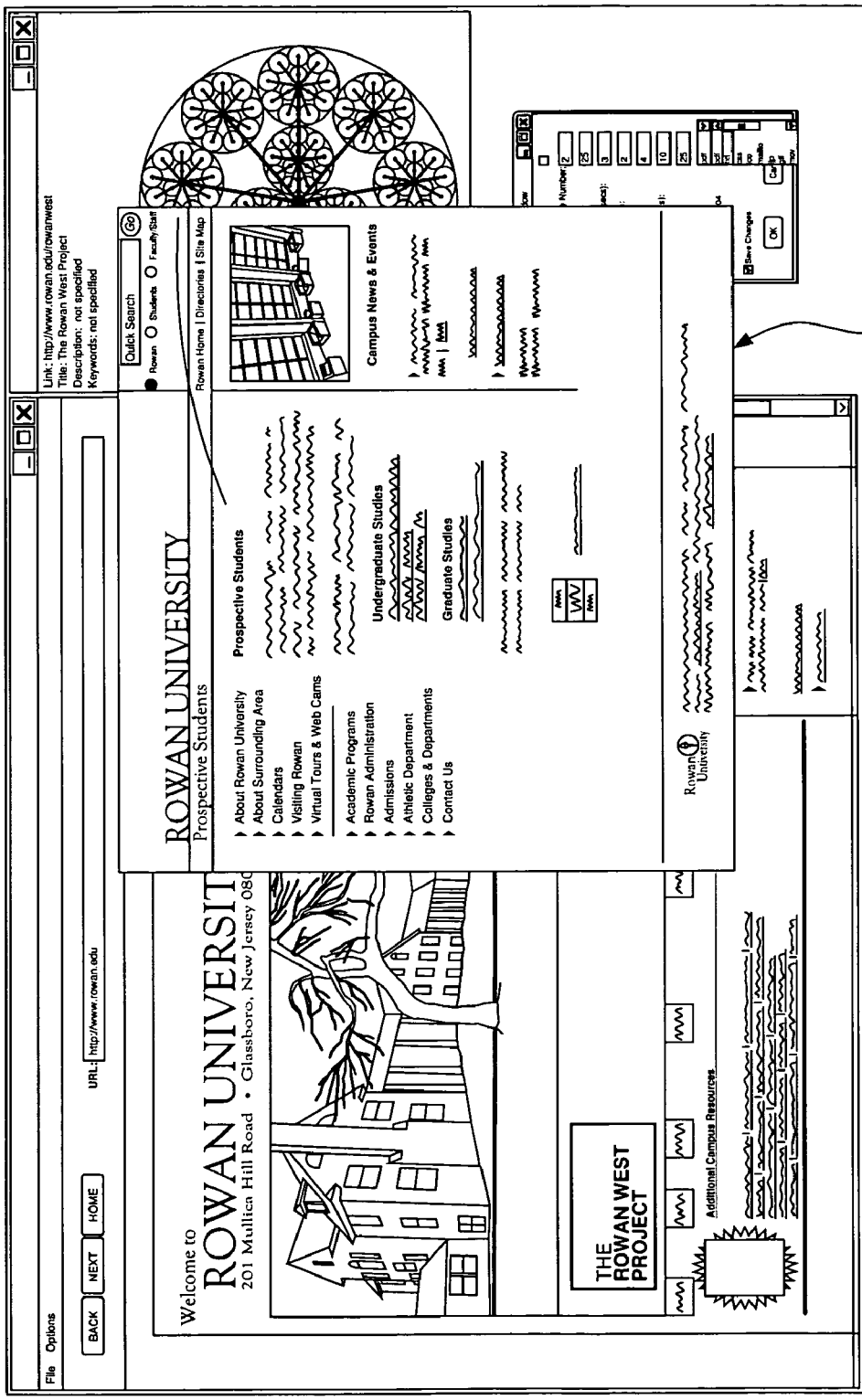
FIG. 5 illustrates a further presently preferred feature of an information visualization system according to the present invention.

FIG. 5 shows a further presently preferred feature of the information visualization system of the present invention. Assume a user has reached a valid page on a Website (which is displayed in browser window 10). Assume also that the user wants to "pre-screen" other pages of that Website via links existing on the displayed page in the browser window. If a link in the displayed Web page is hovered over, left or right clicked or otherwise selectively identified by a user, and if the link exists in the visualization system, then the location of the link is identified (such as, for example, by illumination, highlighting, change in color, change in shade, or the like, in the visualization window 12), thereby establishing a truly synchronized system between display and visualization. Concurrently, a "read only" image 27 of the Web page to be pre-screened is displayed on the user's computer monitor screen, preferably superimposed over browser window 10 and visualization window 12. In accordance with the present invention, the pre-screened Web page image 27 is generated in real-time and displays the image as it presently exists. Similarly, and significantly, Web pages may also be loaded in the browser and displayed in browser window 10 and/or pre-screened when chosen from links contained in the visualization window 12.

A related but different feature is presently offered by the search engine "ask.com". However, the ask.com "pre-screen" image is a pre-recorded archive image of the web page that is selected by a Website manager. It may be hours old, days old, weeks old, or even older. Unlike image 27 of FIG. 5, it is not a real-time pre-screen image such as that which would be produced by the Web page processing logic of the information processing system according to the present invention, which analyzes a Web site in real-time in the manner described in greater detail below. Even though the pre-screen image is a real-time capture, some time is needed in generating and displaying the image.

Progressive animation states of a Website visualization depicting how continuous animation is implemented in the visualization window 12 in accordance with the present system are presented in FIGS. 6(a)-6(e).

FIG. 6(a): The user selects a node 22 (subtree) from a parent node 24 for focus change. According to the invention, the parent or main node is the largest node displayed in visualization window 12. Upon selection, the selected node 22 (subtree) may be changed to a predetermined or predeterminable color shade different from the color shade of the other subtree nodes of the parent node to distinguish it from the other subtree nodes. Alternatively, once selected, node 22 may be changed to a predetermined or predeterminable color different from the other nodes.

Additionally, in order reduce the likelihood of user confusion as to which node she may potentially select, it is preferable, although not necessary, that only the label of the currently "hovered over" node remain visible while the labels of the other nodes are turned off, as shown in FIG. 6 (a).

FIG. 6(b): The selected node 22 is extracted from the parent node 24 and enlarges while the parent node shrinks. The selected node is then located partially outside of the parent node. In addition, the link between the two nodes is desirably thickened to more clearly display the user's history trail.

FIG. 6(c): The selected node 22 continues to enlarge and becomes located completely outside of the initial parent node 24 as the initial parent node continues to shrink.

FIG. 6(d): The selected node 22 expands to the size of the initial parent node and the initial parent node 24 shrinks the size of the children in the new main (selected) node. At this point, space 26 is made available in the lower right part of the new larger node 22.

FIG. 6(e): Once room inside the node 22 has been made available, the former parent node 24, now shrunk, moves to the newly created space 26 of FIG. 4(d) and node 22 becomes the new parent or main node displayed in visualization window 12.

Although not preferred, it is also conceivable that the foregoing animation process, which is desirably smooth and continuous, may be eliminated partially or in its entirety. In such case, the act of selecting a link as shown in FIG. 6(a) may be accompanied by little or no animation and the result shown in FIG. 6(e) may appear with little or no intermediate animation on the user's computer monitor screen.

FIG. 6(e) also preferably displays the newest to oldest links selected by a user at the conclusion of the animation. In this regard, the chronological hierarchy of selected links (i.e., most recent to oldest link) may be represented in the new parent node by at least one change in appearance between the newest visited link (i.e., most recently visited link) and the older visited link(s).

For example, the most recently visited link may be the thickest link and progressively more chronologically distant visited links may be represented by progressively thinner links.

Alternatively, the most recently visited link may be the darkest link with progressively more chronologically visited links may be represented by progressively lighter links.

The hierarchical order of most recent to oldest visited links may also be based on the visible spectrum. That is, the most recently visited link may be represented in red and each successively more chronologically distant link may be represented by a different color along the visible spectrum, whereby the oldest would be represented in violet. Other color-based hierarchical chronological categorization schemes may be readily developed by persons of ordinary skill in the art and are considered to be within the scope and spirit of the present invention.

Still further, the most recent link may be represented by a solid or continuous line, the second most recently accessed link may be represented by a two-part segmented line, the third most recently accessed link may be represented by a three-part segmented line, and so on.

It is also contemplated that the reverse of any one or more of the foregoing schemes may also be used to indicate the most recent to the oldest node visited by the user.

Thus, the brightest (or darkest), thickest (or thinnest), least segmented (or most segmented), or otherwise most visibly prominent link, or visible spectrum sequenced (or other color-ordered) link, may be the most recently selected link and decreasingly bright (or dark), thick (or thin) or otherwise decreasingly visually prominent (and/or color-ordered) links may represent links starting from the most recently selected link to oldest selected link. It is also contemplated that the newest to oldest selected link may be represented by two or more of the distinguishing characteristics described above. By way of illustration, but not limitation, the link to the most recent node may be represented by any two or more of (a) darker, (b) thicker, and (3) solid line (as opposed to segmented line) in relation to the less recently selected links.

Figure 7:
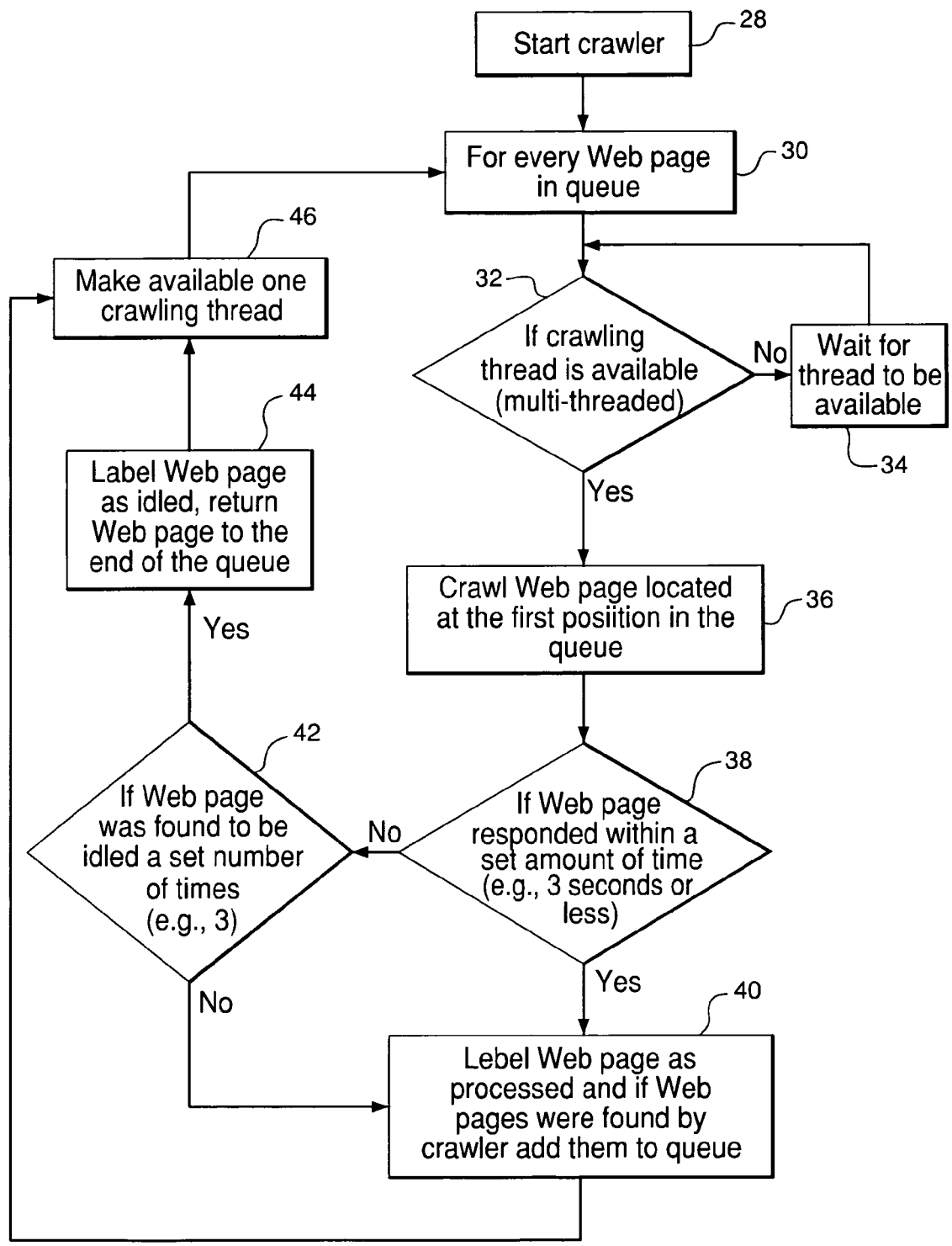
FIG. 7 is a flow diagram depicting the process by which the present system processes all web pages.

FIG. 7 illustrates the manner by which the Web crawler of the present invention processes every page of a Website that is accessed via the URL textbox 16 of browser window 10 in real-time. The crawler is started at step 28 and begins querying each page of the site beginning with the page entered into the URL textbox 16 at step 30. That is, at step 32 the crawler first determines whether a crawling thread is available. As described in greater detail below, the instant system is preferably a multi-threaded application for purposes of efficiency and user convenience. If a thread is not unavailable, the crawler waits at step 34 until a thread is available. When a thread becomes available, the crawler crawls the first Web page in the queue at step 36. Thereafter, the crawler determines at step 38 whether the Web page responds within a selected period of time that may be manufacturer-predetermined or, more preferably, user-predeterminable as desired by the user, as described below. In the illustrated example, the response time is set at three seconds. If the Web page responds within the predetermined time, at step 40 the crawler labels the page as processed. And, if additional pages of the Website are found by the crawler they are added to the queue.

The crawler may determine that a Web page does not respond within the predetermined time. In that event, it proceeds to step 42 wherein it queries whether the Web page is found to be idled for selected number of times that may be manufacturer-predetermined or, more preferably, user-predeterminable as desired by the user, as described below. In the illustrated example, the idle Web page query is set at three cycles. If the Web page is found to be active within the predetermined number of query cycles, then the page is labeled as processed at step 40. If, however, the Web page does not respond within the set number of cycles as indicated by step 42, the crawler labels the page as idled and returns the page to the end of the queue at step 44. At the conclusion of step 40 or step 44, the crawler makes one crawling thread available at step 46 for the next web page in the queue.

Figure 8:
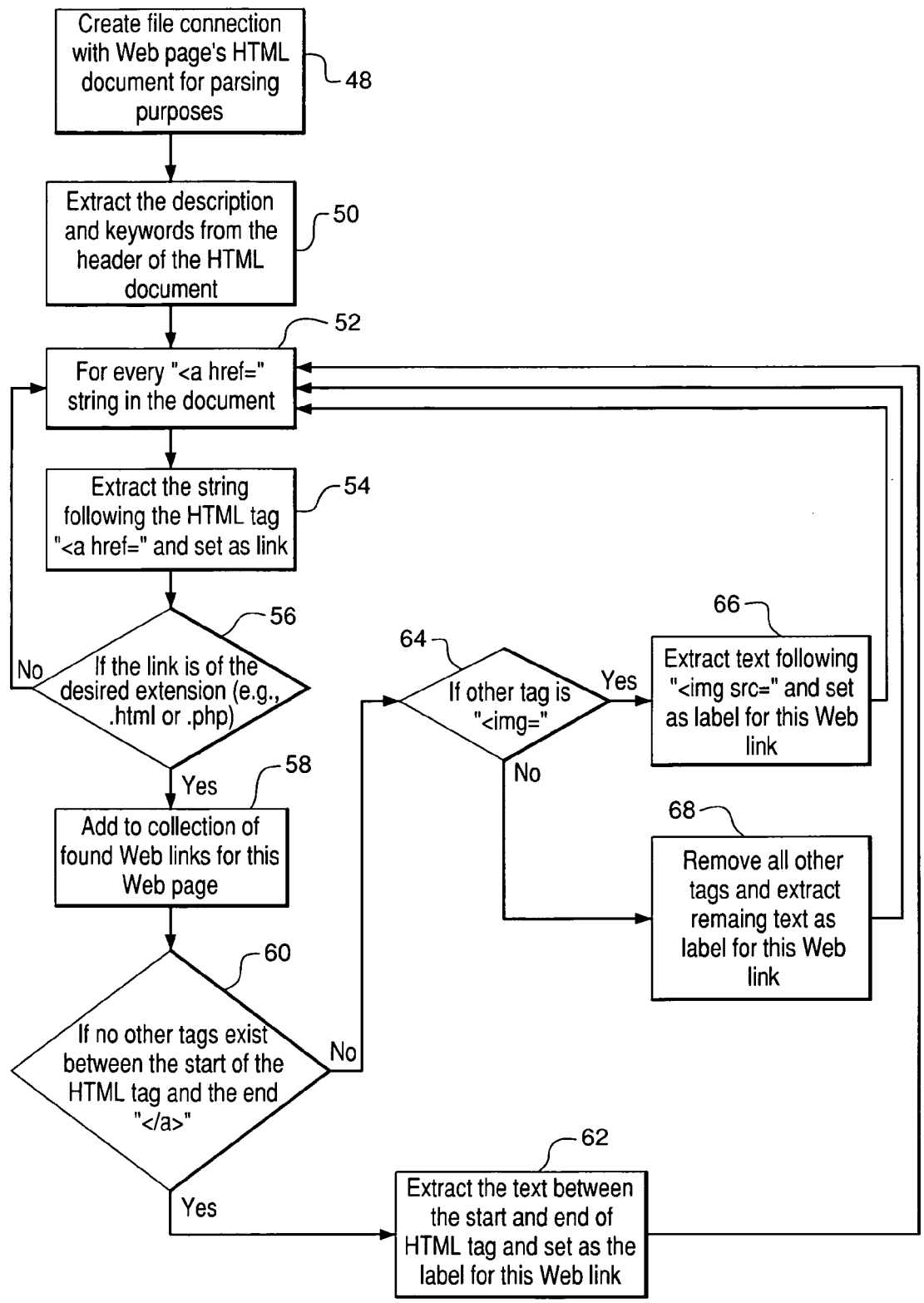
FIG. 8 is a flow diagram depicting the process by which the present system processes a single Web page and extracts Web links therefrom.

FIG. 8 reflects the process by which the present system processes a single presently known or possibly hereinafter developed Web page and extracts Web links therefrom. This process represents that which may be used for extracting links from the currently most common types of Web pages. It is contemplated that a similar process may be used for other presently known although less commonly used types of Web pages or hereinafter developed types of Web pages without departing from the spirit and scope of the present invention. At step 48, the crawler creates a file input/output ("IO") connection with the page's hypertext markup language ("HTML") document for parsing purposes. At step 50 the crawler then extracts the description and the keywords from the header of the HTML document. The crawler first searches the document at step 52 for every "<a href=" string. A hyperlink or "link" has two ends known as anchors, and a direction. The link starts at the "source" anchor and points to the "destination" anchor, which may be any Web resource (e.g., an image, a video clip, a sound bite, a program, an HTML document, an element within an HTML document, etc.). "a href" defines a link between the source anchor and the destination anchor. At step 54 the crawler extracts the string following each HTML tag "<a href=" and defines that string as a link. At step 56 the crawler determines whether the link is of the desired file extension (e.g., .html, .php, etc.). It will be understood that any type of file extension may be included or excluded as acceptable or unacceptable files in accordance with the present invention. If at step 56 the crawler finds that the link is to an unacceptable file extension, the algorithm returns to step 52 and re-executes steps 52 and 54. If, however, the crawler finds the file extension to be acceptable it adds the link to the collection of found links for the Web page at step 58.

At step 60 the crawler queries whether any other tags exist between the start of the HTML tag and the end "</a>". If the answer to that query is "yes", then at step 62 the crawler extracts the text between the start and end of the HTML tag and sets that text as the label for a Web link. The crawler then returns to step 52 and then analyzes the next string following the next HTML tag "<a href=". If, however, at step 60 the crawler finds that a tag "<img=" (image) exists, it proceeds to step 64 where it further scrutinizes the image file. More specifically, if the "img" file is followed by "src", i.e., "<img src=", then at step 66 the crawler extracts the text following "<img src=" and sets that text as a label for a web link and returns to step 52 to analyze the next HTML tag "<a href=". In the alternative, if the "img" file is not followed by "src", at step 68 the crawler removes all other tags and extracts the remaining text as a label for the Web link and returns to step 52 to analyze the next HTML tag "<a href=".

Figure 9:
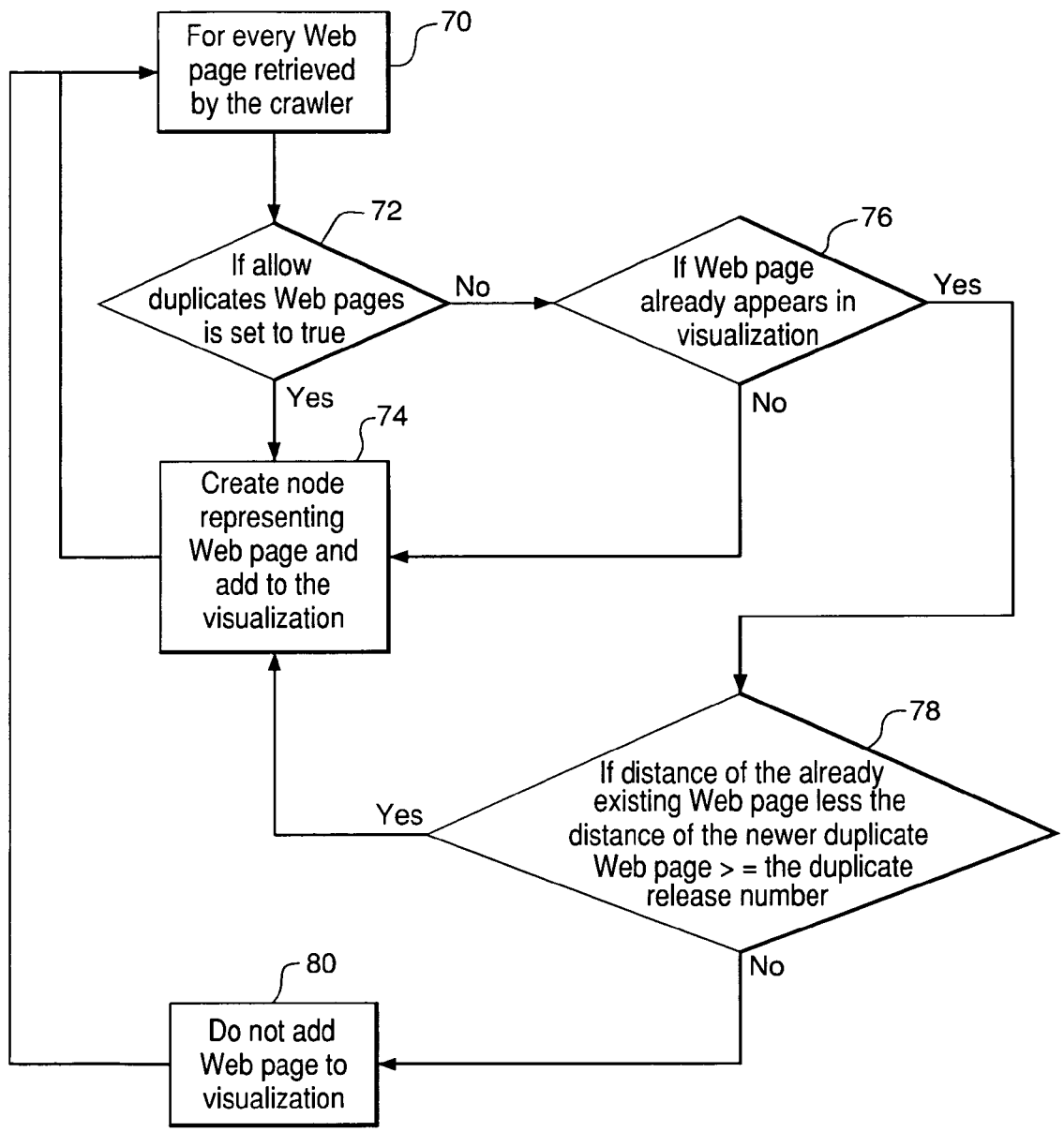
FIG. 9 is an algorithm illustrating the logic by which the present system adds a Web page to the visualization of the present invention.

FIG. 9 illustrates how the present invention adds a new Web page to the visualization application and, thus, to the visualization window 12. Beginning at step 70, the crawler analyzes every Web page it retrieves and, depending on user preference, determines at step 72 whether duplicate Web pages may be added to the visualization. If duplicate pages are permitted, then the algorithm creates a node corresponding to the duplicate Web page at step 74 and returns to step 70 to analyze the next retrieved Web page. If duplicate pages are not permitted, then the algorithm queries at step 76 whether the Web page already exists in the visualization. If the answer is "no", then the algorithm returns to step 74 to add the new node to the visualization and thereafter to step 70 to analyze the next retrieved page. If the answer is "yes", then the algorithm proceeds to step 78.

The present system and method defines the distance between two Web pages as the number of hyperlinks it takes to travel from one Web page to the other. At step 78, the algorithm of the instant invention uses the distance value of duplicate Web pages to determine whether the Web pages have at least a specified, preferably user-specified, distance between them. This distance is identified by reference numeral 84 of FIG. 10, described below. If the answer at step 78 is "yes", then the algorithm returns to step 74 to add the new node to the visualization and thereafter to step 70 to analyze the next retrieved page. If the answer at step 78 is "no", then the algorithm determines at step 80 to not add the Web page to the visualization and returns to step 70 to analyze the next retrieved page.

Figure 10:
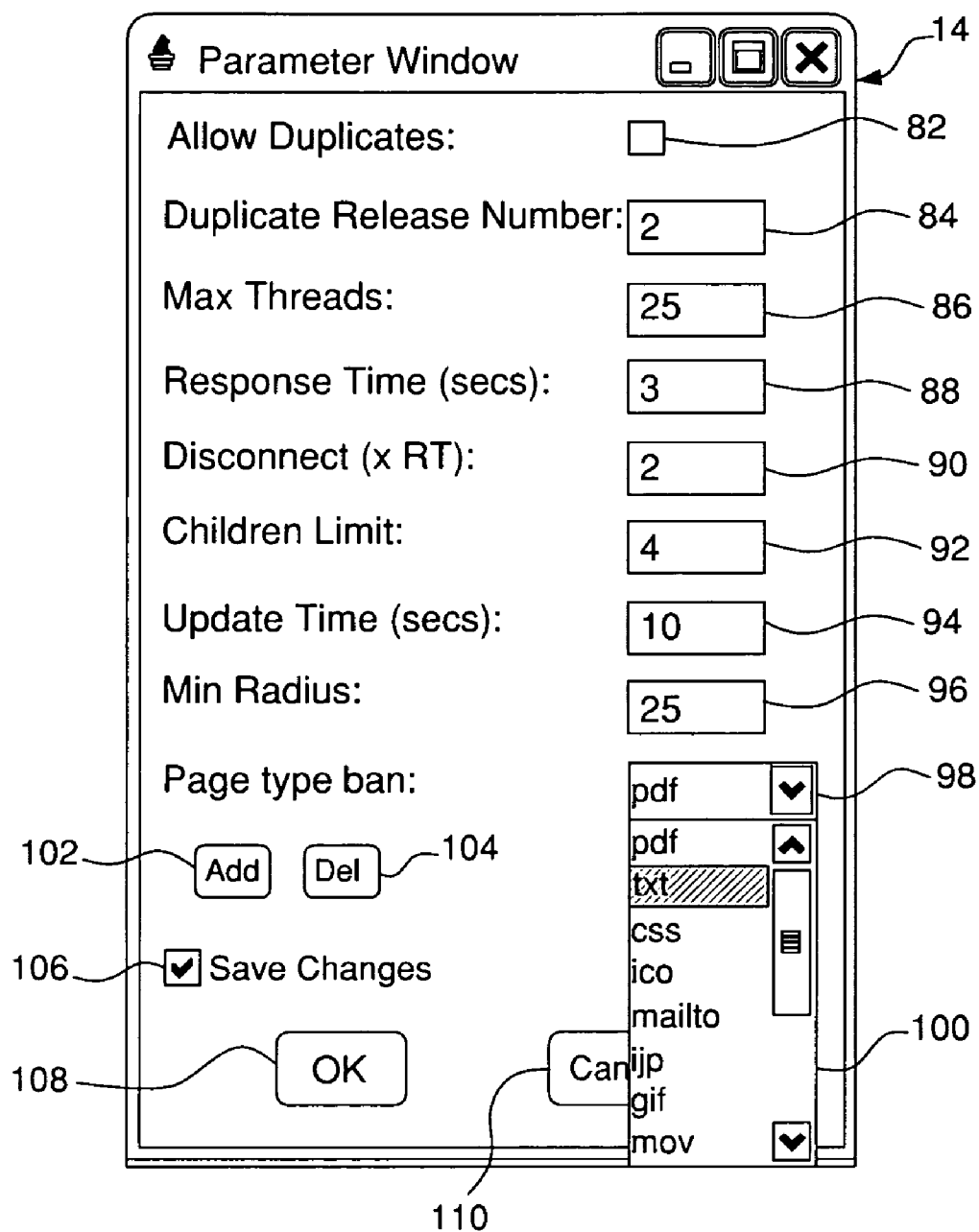
FIG. 10 is a representative example of a parameter window according to the present invention.

FIG. 10 represents a parameter window 14 containing some presently preferred parameters that affect the operation of the information visualization and design system according to the present invention. These parameters may be predetermined by a manufacturer. However, for optimum end-user flexibility it is preferred that one or more of these parameters may be adjusted or predeterminable by the end user. It will be understood that the listed parameters are merely descriptive, and not limitative, of the system's operational parameters that may be controlled by a user of the present invention.

Beginning at the top of parameter window 14 (although the arrangement of the parameters is immaterial), the window preferably includes an "Allow Duplicates" parameter 82 that allows a user to allow duplicate Web pages to be produced in the visualization. If checked, this box permits duplicate Web pages in the visualization. If not checked (the default state), only unique pages will appear in the visualization. At present, the criterion for determining a duplicate Web page is a Web address. Duplicate links are generally undesirable, however, because, if included, less information is presented in the visualization, especially in the case of framed Websites.

Following the "Allow Duplicates" parameter is a "Duplicate Release Number" parameter 84. This parameter permits a Web page to be released from "duplicate" status if it is a certain distance away from its matching Web page position in the visualization. "Distance" in the present context is defined as the depth into the visualization that a Web page appears. For instance, the root Web page is distance 0, its children Web pages are distance 1, Web pages located within a Web page of distance 1 are defined as distance 2, and so on.

The present invention preferably employs a multi-threaded approach in which Web pages are accessed by different threads. As such, the user can assign the maximum number of threads to be employed via the "Max Threads" parameter 86 in the parameter window. It is desirable to limit the number of threads that can coexist in the system so that the processor is not overcharged.

A considerable problem to be resolved in order for effective functioning of the present invention is slow-answering servers. Some servers are slower to respond to the crawler. Other servers do not respond at all. Being a real-time system, the instant visualization needs information from the crawler without delay in order to be generated. For this reason, the parameter window 14 enables a user to establish time limits in which a server must respond. These time limits are selected by the user through the combination of the "Response Time" and "Disconnect Round Trip" (Disconnect×RT) parameters 88 and 90, respectively. If a server does not respond, it is placed in a queue with other non-responsive and unprocessed links for another "round trip" and again served when a thread becomes available. In that event, the drawing algorithm will simply continue under the assumption that the page that could not be retrieved is not active. In order to keep the system real-time, the visualization first displays the links to which the crawler establish the quickest connection. Links with slower connections are simply added to the visualization while the user is analyzing the new information. And, if a link is not processed within the set number of round trips in parameter 90, it is disregarded by the system and omitted from the visualization.

These time limits, although necessary in order to make the system real-time, may have a negative effect on the accuracy of the data displayed, depending on how fast the user is analyzing the new information. If the user is moving too quickly, some pages might be displayed as having no links deriving from them, while, in fact, they might just be located on slow servers. Our system enables users to adjust these time limits and decide whether they want a slower more accurate system or a faster less accurate one.

The number of Web links extracted from a Web page is controlled by the "Children Limit" parameter 92. Since the present visualization can handle any size tree, the user can limit the amount of data represented by adjusting the Children Limit parameter to preference. Link extraction is performed sequentially, and crawling is terminated when the Children Limit parameter is met, or the end of the Web page's HTML source code is reached.

The frequency at which the visualization is updated or refreshed by the crawler's findings at the rate denoted by the "Update Time" parameter 94. Additionally, the crawler is halted when a certain Website depth is reached. This depth is established by the visualization drawing the results at the desired depth at a circle radius smaller than the "Min (Minimum) Radius" parameter 96.

To eliminate Web pages that may not be useful or desirable, the "Page Type Ban" parameter 98 allows the crawler to neglect specific Web page types as selected from menu 100, followed by clicking on either the Add or Del(Delete) buttons 102 and 104, respectively. In addition, the crawler skips links that have already been added to the visualization. Once the user has entered the desired parameters into parameter window 14, she checks the "Save Changes" box 106 and clicks on "OK" button 108. If the user decides not to save the changes, then she clicks on "Cancel" button 110 (partially obscured by menu 100 in FIG. 8).

It is also contemplated that one or more of the above-described parameters may be automatically determined (and preferably optimized) by an intelligent algorithm that monitors user behavior, system specifications (e.g., analyzes threads based on the user's system capability) and/or the user's connection specifications (e.g., dial-up versus cable, wireless or other Internet connection).

Figure 11:
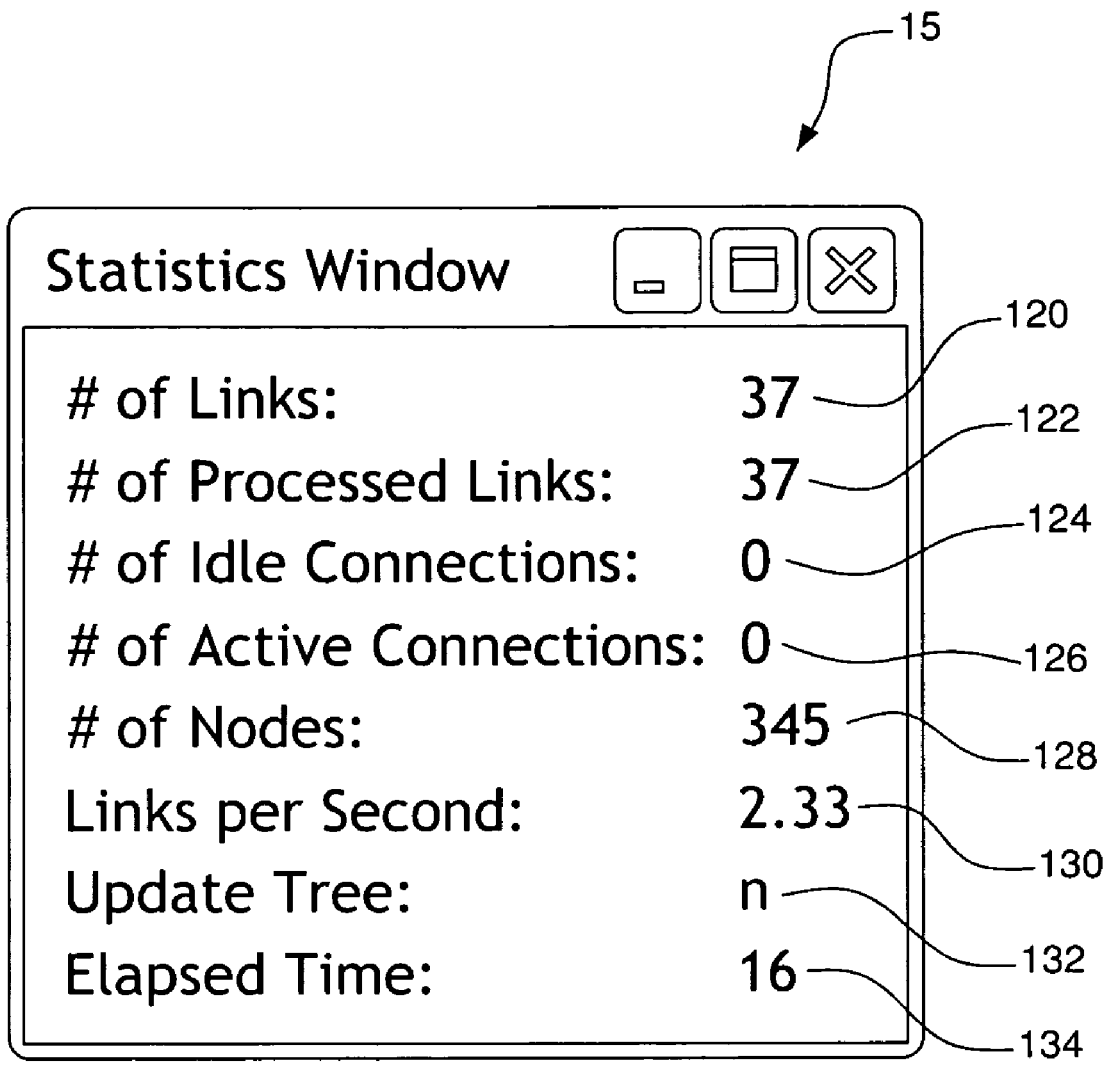
FIG. 11 is a representative example of a statistics window according to the present invention.

FIG. 11 represents a statistics window 15 that displays performance information about an information visualization system according to the present invention. As the system progresses in time when analyzing a Website or other data source, system performance statistics are updated in window 15. The statistics shown in window 15 preferably reveal the current status of the system as it is executing, i.e., in real time. Like parameter window 14 of FIG. 10, statistics window 15 is desirably selectively displayed (and selectively hidden) by a user. Representative, but not limitative, system performance statistics are as follows:

Number of links (120): the total number of links located by the crawler, both processed and unprocessed.

Number of processed links (122): the number of processed links by the crawler.

Number of Idle Connections (124): the number of established connections in the idle state. The "idle state" refers to how many current non-responsive links are detected.

Number of Active Connections (126): the number of established connections which are active or in the running state. The "running state" refers to how many links the system is presently processing.

Number of Nodes (128): the current total number of nodes available in the visualization.

Links per Second (130): the rate at which links are added by the crawler for processing.

Update Tree (132): indicates whether the visualization (i.e., the tree drawing graphic in visualization window 12) is updating with new nodes. The indicator may be either "y", "yes" or other recognizable symbol, e.g. "1" (for "positive") or "n", "no" or other recognizable symbol, e.g. "0" (for "negative").

Elapsed Time (134): the time in seconds since the application was launched.

It is preferable, although not necessary, that the system performance data to be monitored is preselected by the system manufacturer. However, it is also contemplated that any system performance data chosen for monitoring (including those identified above or otherwise) can be selected (and changed, if desired) by the end user.

The system parameters selected by the end user (or automatically determined by an intelligent algorithm) and displayed in parameter window 14 of FIG. 10 affect the system performance data displayed in statistics window 15 of FIG.

11. Accordingly, the end user should be provided with instruction as to how the parameters of FIG. 10 impact the performance data monitored by the statistics window 15 of FIG. 11.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. A computer-based information visualization system comprising:
   a browser window visible on a first region of a screen of a computer monitor; and
   a visualization window containing a graphical map of an information hierarchy visible on another region of a screen of a computer monitor, wherein said graphical map displayed by said visualization window is populated according to the following steps:
   (a) executing the following algorithm, beginning with an outermost ring of nodes to be placed within an outer boundary circle of said graphical map:

```
Algorithm Find k
    Input: the total number of nodes (children) in a tree, N;
    Output: the number of circles to place in a ring, k;
    minDifference = INFINITY;
    //Find the arrangement that results in the percent of
    nodes and area left after placement being the closest;
    for each number of node i in N {
        areaLeft = f(i);
        nodesLeft = 1 – (i/N);
        if ( areaLeft < nodesLeft ) then
            difference = nodesLeft – areaLeft;
        else
            difference = areaLeft – nodesLeft;
        if ( difference < minDifference ) {
            minDifference = difference ;
            k ToReturn = i;
        }
    }
    //Do not want one node left, so add to previous
    if (N–k ToReturn) = 1 then
        return (k ToReturn+1);
    return k ToReturn;
end Algorithm;
```

(b) placing k circles in said outermost ring;
   (c) for a next inner ring, re-executing the algorithm of step (a) substituting the previous N with a new N equal to the previous N minus the calculated k;
   (d) placing k circles in said next inner ring; and
   (e) repeating steps (c) and (d) until the total nodes in the tree have been placed into said graphical map.

2. The system of claim 1 wherein, for optimum use of space in a particular ring, k/N ? f(k).

* * * * *